United States Patent
Gu et al.

(10) Patent No.: US 7,865,957 B1
(45) Date of Patent: Jan. 4, 2011

(54) APPARATUS AND METHODS FOR UPDATING MOBILE DEVICE VIRUS PATTERN DATA

(75) Inventors: Yan Gu, Nan Jing (CN); Chao Fang, Nan Jing (CN)

(73) Assignee: Trend Micro Inc., Tokyo (JP)

( * ) Notice: Subject to any disclaimer, the term of this patent is extended or adjusted under 35 U.S.C. 154(b) by 983 days.

(21) Appl. No.: 11/678,952

(22) Filed: Feb. 26, 2007

(51) Int. Cl.
*G06F 11/00* (2006.01)
*H04L 9/00* (2006.01)
*H04L 9/32* (2006.01)

(52) U.S. Cl. ............................ 726/24; 726/25; 726/26; 726/27; 726/28; 726/29; 713/187; 713/188; 713/189

(58) Field of Classification Search .................... 726/24
See application file for complete search history.

(56) References Cited

U.S. PATENT DOCUMENTS

| 2002/0136408 A1* | 9/2002 | Garcia ........................ 380/259 |
| 2007/0100653 A1* | 5/2007 | Ramer et al. ................... 705/1 |
| 2007/0180251 A1* | 8/2007 | Carr et al. ................... 713/176 |

* cited by examiner

*Primary Examiner*—Longbit Chai
(74) *Attorney, Agent, or Firm*—IP Strategy Group, P.C.

(57) ABSTRACT

What is disclosed includes a method for updating virus pattern data in at least a mobile device for one or more anti-virus purposes. The method may include processing a virus pattern to generate one or more images. The method may also include providing the one or more images such that the one or more images are acquired by the mobile device. The mobile device may perform at least one of parsing and decoding of the one or more images to obtain the virus pattern. The mobile device may then update the virus pattern data utilizing the virus pattern.

20 Claims, 3 Drawing Sheets

```
Vmc7ncu3SVmEvtNuLq1uu499IcajM5f2OeghRka6zRGi5XPemu3chZvic36/nfPzN4eUxn03P0fe
k9Y36MNfuuuhbn2tQSZRl3q4kAH6lkc8ocWah6W/y/gkJN+aAb9ttzrilalj8C7fMIVBgnseG/JAhq
zmmAW3f1c8o1gcnfu/LyuPz0hRry8+PALY5l64dNOe7K95kyLyvTL8y1HyPmX8PNrfYzv+ZH
YD23lvNzJAZki3Gvk49WzN2JsE867uO5YYeBnRA3A8uo3AHZkb7lttK8pqXYOS3Le5V8NNv
VSPcDP6X1cnqwO0jnpgHMFmmnj13qDPhvk8plO54KjebtSmSwaLL+CTpfW9h23d6ddcmMCF
0CWTvtJaZRDr5xiFr487t4i3+WgJdhgno06hL0y1W9S9RPqd8OpBzjd6ynZ1LEkxYtVjFbUUmi
pGatWwW0sEd0q5bTM6c/OrWLl6umqGLCIK7N8R9xdEEBt8pqFMmwN/4

APPARATUS AND METHODS FOR UPDATING MOBILE DEVICE VIRUS PATTERN DATA

BACKGROUND OF THE INVENTION

Like conventional computer viruses, viruses targeting mobile devices (e.g., notebook computers, tablet computers, cellular phones, smart phones, PDAs, etc.) may be frequently created and distributed by various virus writers for one or more reasons or purposes, such as research projects, pranks, vandalism, attacking products of specific companies, distributing political messages, and financial gain from identity theft. Many of the viruses may cause significant problems and/or damages, such as loss of data, malfunction of devices, and/or leakage of private or confidential information.

For sufficient protection against viruses, users of mobile devices may need to update virus pattern data in the mobile devices, such that anti-virus programs running in the mobile devices may be able to effectively detect new viruses. A virus pattern (or virus signature) generally represents a unique string of bits, or a binary pattern, of all or part of a mobile device virus or a computer virus. Virus patterns may be like fingerprints in that a particular virus pattern can be utilized to detect and identify one or more specific viruses.

Generally, there have been two schemes for updating mobile device virus pattern data: updating through a networked computer and updating through a wireless/mobile data network.

A user of a mobile device may update virus pattern data through a networked computer. Under this scheme, the mobile device may connect to a computer through a wired connection (such as a USB or mini-USB connection) or short-range wireless connection (such as an infrared or Bluetooth® connection) and then download a virus pattern from an intranet or the Internet via the connection and the computer. Alternatively or additionally, the virus pattern may be first downloaded to the computer through the intranet or the Internet, and the virus pattern may then be transmitted to the mobile device through the connection.

Under the networked-computer scheme, the computer is typically required to be connected to the intranet or the Internet. The user generally needs to install special software in the computer in order for the computer to download and transmit the virus pattern. Further, the user may need to configure the connection between the mobile device and the computer such that the mobile device may be able to receive the virus pattern from the computer. Generally, installing the special software and configuring the connection may be inconvenient and even difficult for an average user of a mobile device. Further, when there is no computer or intranet/Internet connection, updating virus patterns may become impossible under the networked-computer scheme.

Alternatively, a user of a mobile device may update virus pattern data through a wireless/mobile data network, such as a Wi-Fi, GPRS, CDMA2000, or WCDMA network. If the mobile device is Wi-Fi equipped and the user is to utilize a Wi-Fi network for the updating, the user may need to configure the mobile device for connecting the mobile device with the Wi-Fi network. Generally, the configuration may be inconvenient and even difficult for an average user. If a mobile data network, such as a GPRS, CDMA2000, or WCDMA network, is employed for the updating, the user may have to pay for the data traffic for requesting and downloading the virus pattern.

In general, under both of the above schemes, network resources may be required and consumed in every virus pattern updating action.

SUMMARY OF INVENTION

An embodiment of the present invention relates to a method for updating virus pattern data in at least a mobile device for one or more anti-virus purposes. The method may include processing a virus pattern to generate one or more images. The method may also include providing the one or more images such that the one or more images are acquired by the mobile device. The mobile device may perform at least one of parsing and decoding of the one or more images to obtain the virus pattern. The mobile device may then update the virus pattern data utilizing the virus pattern.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates a sample virus pattern with base 64 encoding in accordance with one or more embodiments of the invention.

FIG. 2B illustrates a sample QR code resulted from encoding a virus pattern in accordance with one or more embodiments of the present invention.

DETAILED DESCRIPTION OF EMBODIMENTS

Figure 1:
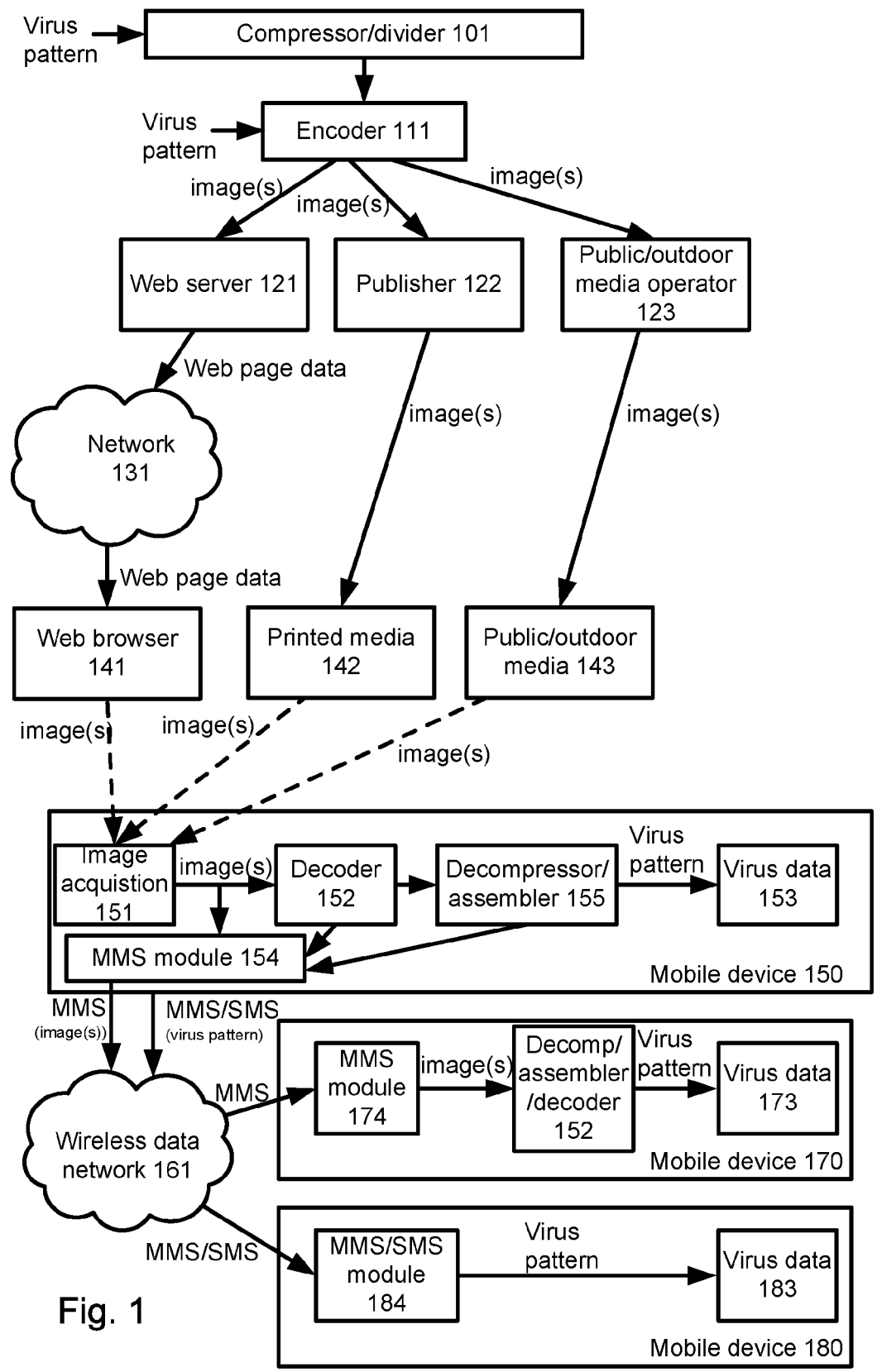
FIG. 1 illustrates an arrangement for updating mobile device virus pattern data in accordance with one or more embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a method for updating virus pattern data in at least a mobile device for one or more anti-virus purposes. The method may include processing a virus pattern to generate one or more images. The method may also include providing the one or more images such that the one or more images are acquired by the mobile device. Subsequently, the mobile device performs at least one of parsing and decoding of the one or more images to obtain the virus pattern, and the mobile device updates the virus pattern data utilizing the virus pattern.

The processing may include compressing the virus pattern to generate a compressed virus pattern and encoding the compressed virus pattern to generate the one or more images. Alternatively or additionally, the processing may include dividing the virus pattern to generate a plurality of partial virus patterns and encoding the plurality of partial virus patterns to generate the one or more images.

The one or more images may include at least one of a matrix code (or 2D barcode, such as a QR code) and a linear barcode, and may show no alphanumerical symbol. The one or more images may be displayed in at least one of a webpage, a displayed item, a television image, a printed medium, an outdoor medium, an email message, and a multimedia message. The one or more images may be displayed along with a message, such as a piece of news concerning a certain virus, in a language comprehensible to a user of the mobile device. The one or more images may be acquired by an image acquisition component, such as an image sensor, a camera, and/or a scanner, of the mobile device.

The mobile device may further perform one or more of decompression and assembly of intermediary data resulted from the at least one of parsing and decoding of the one or more images before obtaining the virus pattern.

One or more embodiments of the present invention relate to an apparatus for updating a set of virus pattern data for one or more anti-virus purposes. The apparatus may include an image acquisition component, such as an image sensor, a camera, and/or a scanner, configured to acquire one or more images, wherein data pertaining to a virus pattern is encoded in the one or more images. The apparatus may also include a processor configured to perform at least one of parsing and decoding of the one or more images for obtaining the virus pattern. The apparatus may further include software configured to update the set of virus pattern data utilizing the virus pattern.

The apparatus may further include a decompression program configured to decompress the data pertaining to the virus pattern for obtaining the virus pattern. Alternatively or additionally, the apparatus may further include an assembler program configured to combine the data pertaining to the virus pattern for obtaining the virus pattern, wherein the data pertaining to the virus pattern may be encoded in a plurality of images. The plurality of images may be represented by the one or more images.

One or more embodiments of the present invention relate to an apparatus for providing a virus pattern for one or more anti-virus purposes. The apparatus may include an encoder. The encoder may be configured to encode data concerning the virus pattern to generate one or more images. The one or more images may be configured to be acquired by one or more image acquisition devices, such as image sensors, cameras, and/or scanners.

The apparatus may further include a compression program configured to compress the virus pattern to generate the data concerning the virus pattern. Alternatively or additionally, the apparatus may further include a divider program configured to divide the virus pattern to generate the data concerning the virus pattern. The data concerning the virus pattern may be encoded into a plurality of images. The plurality of images may be represented by the one or more images.

The features and advantages of the invention may be better understood with reference to the figures and discussions that follow.

FIG. 1 illustrates an arrangement for updating mobile device virus pattern data in accordance with one or more embodiments of the present invention. As shown in the example of FIG. 1, the arrangement may include a compressor/divider program 101. Compressor/divider program 101 may be configured to compress and/or divide a concerned virus pattern into a compressed virus pattern or into a plurality of partial virus patterns. The arrangement may further include encoder 111 configured to encode a concerned virus pattern, a compressed virus pattern, or partial virus patterns into one or more images. In one or more embodiments, compressor/divider program 101 and encoder 111 may represent part of an apparatus for providing virus patterns for anti-virus purposes.

The one or more images generated by encoder 111 may include a matrix code (also known as 2D barcode), such as QR code developed by Denso Wave Inc. (www.denso-wave.com) or PDF417 developed by Symbol Technologies (www.symbol.com, now a subsidiary of Motorola, Inc, www.motorola.com). Alternatively or additionally, the one or more images may include a linear barcode. The matrix code and/or linear barcode may be further embedded in one or more pictures, symbols, or graphical elements to be displayed.

The one or more images may be published and displayed through one or more media such as the worldwide web, a printed media 142, and a public/outdoor media 143. For example, the one or more images may be stored in a web server 121, transmitted through network 131, and displayed in a web browser 141. The one or more images also may be provided to publisher 122 to be published in printed media 142, such as one or more of magazines, newspaper, fliers, and posters. The one or more images also may be provided to public/outdoor media operator 123 to be published in public/outdoor media 143, such as one or more of billboards, bulletin boards, and exterior and interior advertisement areas of public transportation vehicles. The one or more images may be displayed along with a message, such as a warning, a description, and/or a piece of news pertaining to the concerned virus.

FIG. 1 also illustrates a mobile device 150 in accordance with one or more embodiments of the present invention and under the arrangement. As illustrated in an example of FIG. 1, mobile device 150 may include an image acquisition component 151 configured to capture the one or more images. Image acquisition component 151 may include one or more of an image sensor, a camera, and a scanner (such as an optical scanner or barcode reader). Advantageously, mobile device 150 may obtain the one or more images, which convey the concerned virus pattern, without being connected to a networked computer or a wireless data network, or exchanging data through a wireless/mobile data network.

Mobile device 150 may also include a decoder 152 configured to decode the one or more images into one or more virus patterns. The one or more virus patterns may represent the concerned virus pattern, the compressed virus pattern, or the partial virus patterns.

Mobile device 150 may also include a decompressor/assembler program 155. Decompressor/assembler program 155 may be configured to decompress the compressed virus pattern and/or to assemble the partial virus patterns to obtain the concerned virus pattern. Subsequently, security/anti-virus software installed in mobile device 150 may utilize the concerned virus pattern to update virus data 153, which may be in the form of a file or database, in mobile device 150.

Mobile device 150 may also include MMS module 154 and may send the one or more images in multimedia messages to other mobile devices through a wireless data network 161 utilizing MMS module 154. Alternatively or additionally, mobile device 150 may send the concerned virus pattern in multimedia messages or short messages to other mobile devices.

Mobile device 170, which may or may not be equipped with an image acquisition component, may receive a multimedia message containing the one or more images from mobile device 150 through a MMS module 174. The one or more images may be parsed, decompressed, assembled, and/or decoded by decompressor/assembler/decoder program 152 to provide the concerned virus pattern. In turn, anti-virus software installed in mobile device 170 may update virus data 173 utilizing the concerned virus pattern.

Mobile device 180, which may or may not be equipped with an image acquisition component, may include an MMS/SMS module 184 that may receive a multimedia message or short message containing the concerned virus pattern through wireless data network 161 and from mobile device 150. Accordingly, anti-virus software installed in mobile device 180 may update virus data 183 utilizing the virus pattern.

FIG. 2A illustrates a sample virus pattern 201 with base 64 encoding in accordance with one or more embodiments of the invention. In one or more embodiments, virus pattern 201 may represent an incremental virus pattern that is a difference between two virus patterns, wherein a first virus pattern of the two virus patterns may have been stored in a mobile device, and a second virus pattern of the two virus patterns may be yet to be included. Alternatively or additionally, virus pattern 201 may represent a compressed virus pattern of a concerned virus pattern. Alternatively or additionally, virus pattern 201 may represent a partial virus pattern resulted from a concerned virus pattern being divided.

FIG. 2B illustrates a sample QR code 202 resulted from encoding virus pattern 201 (illustrated in the example of FIG. 2A) in accordance with one or more embodiments of the present invention. QR code 202 may be configured to be captured by an image acquisition component, such as a camera or scanner of a mobile device, as discussed above with reference to FIG. 1. In general, the QR code scheme may provide higher fault-tolerance and higher accuracy than some other matrix code symbology types (or coding schemes), and therefore may be suitable for conveying data concerning virus patterns. Alternatively or additionally, other coding schemes may be employed to provide images that convey virus patterns.

Currently, the capacity of a QR code is limited to 2,953 bytes. Therefore, a concerned virus pattern with a size greater than 2,953 bytes (or a lower threshold, e.g., 2,800 bytes) may be compressed into a compressed virus pattern with a smaller size. The compressed virus pattern may be decompressed in a mobile device. Alternatively or additionally, a concerned virus pattern may be divided into partial (and complementary) virus patterns with smaller sizes. The partial virus patterns may be assembled in a mobile device.

For some viruses, the associated virus patterns may contain a small amount of data, and a linear barcode may be sufficient for conveying a virus pattern.

Figure 3:
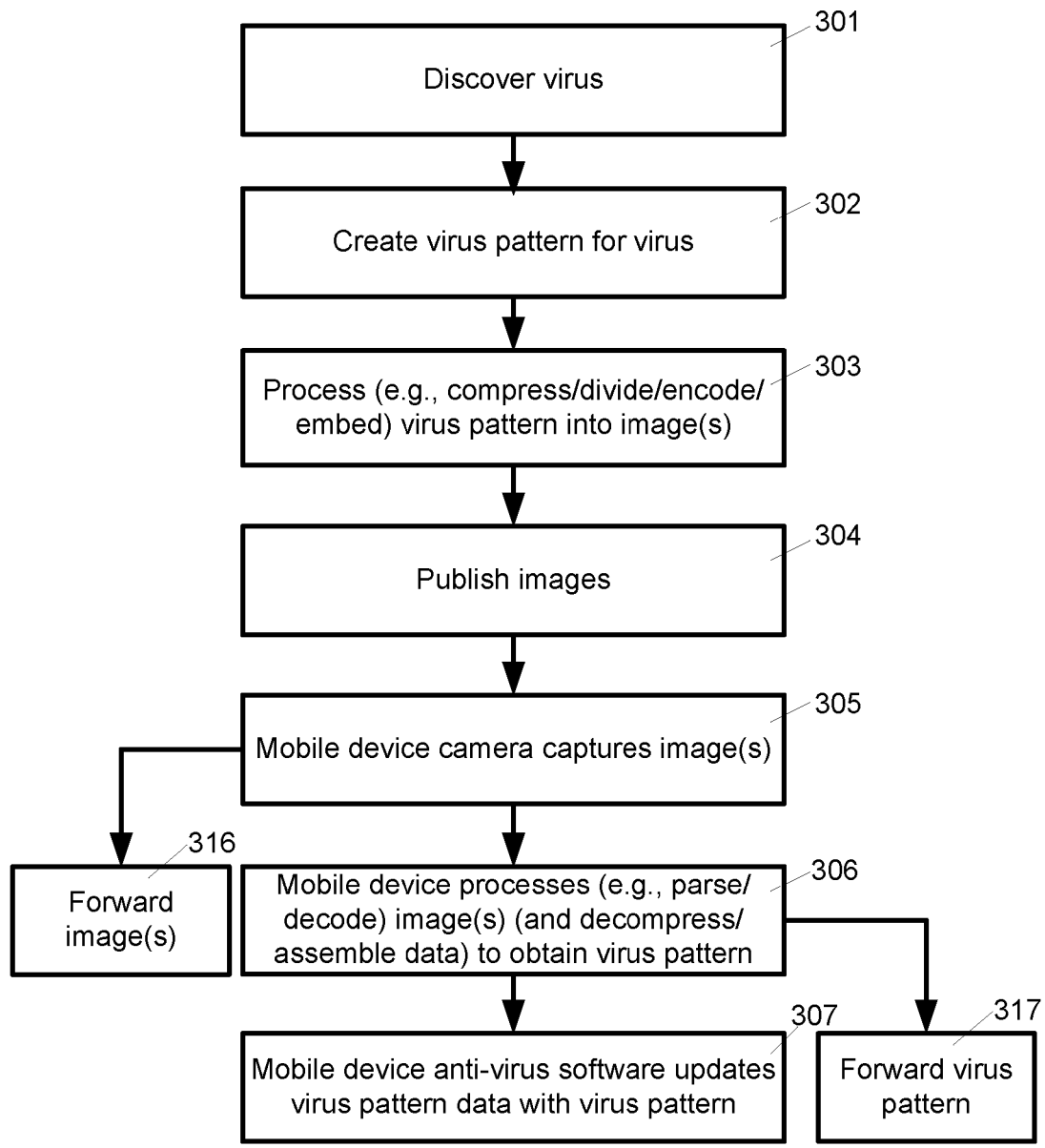
FIG. 3 shows a flowchart of a method for updating mobile device virus pattern data in accordance with one or more embodiments of the present invention.

FIG. 3 shows a flowchart of a method for updating mobile device virus pattern data in accordance with one or more embodiments of the present invention. As shown in the example of FIG. 3, the method may start with step 301, in which an anti-virus software company or anti-virus service provider may discover a certain (new) virus.

In step 302, the anti-virus software company or service provider may create a virus pattern for identifying and detecting the virus.

In step 303, the anti-virus software company or service provider may process the virus pattern into one or more images, which may include one or more matrix codes, e.g., one or more QR codes. The processing of the virus pattern may include one or more of compressing, dividing, encoding, and embedding.

In step 304, the anti-virus software company or service provider may publish the one or more images through various media. The media may include one or more of the internet, television network, printed media, public/outdoor media, e-mail messages, and multimedia messages. The one or more images may be published along with news, a warning, and/or a description concerning the virus, as well as an advertisement about the anti-virus software company or service provider.

In step 305, a user of a mobile device may utilize the camera of the mobile device to capture the one or more images. Advantageously, the mobile device may obtain the one or more images, which convey the virus pattern, without being connected to a networked computer or a wireless data network, or exchanging data through a wireless data network.

In step 316, the user may forward the one or more images to other mobile devices utilizing one or more messaging functions of the mobile device, such as one or more of multimedia messaging service and e-mail functions. Following step 316, the mobile devices which receive the one or more images may process the images to obtain the virus pattern and, accordingly, update virus pattern data.

In step 306, the mobile device may process the one or more images and conveyed data to obtain the virus pattern. The processing may include one or more of parsing and decoding of the one or more images, and one or more of decompression and assembling of the conveyed data.

In step 317, the user may forward the virus pattern to other mobile devices utilizing one or more messaging functions of the mobile device, such as one or more of multimedia messaging service, short message service, and e-mail functions. Following step 317, the mobile devices that receive the virus pattern may update virus pattern data utilizing the received virus pattern.

In step 307, anti-virus/security software residing in the mobile device may update virus pattern data stored in the mobile device with the virus pattern.

As can be appreciated from the foregoing, embodiments of the invention may enable users of mobile devices (equipped with image acquisition components) to update virus pattern data without relying on the availability of computers, associated network connections, and wireless/mobile data network connections. As a result, embodiments of the invention may help the users save configuration efforts and/or wireless data transmission costs, and may help network operators conserve network resources.

Further, according to embodiments of the invention, the users may be able to readily and timely update virus pattern data at the moment the users learn about particular viruses, since the images conveying the virus pattern data may be published along with news concerning the viruses.

Advantageously, embodiments of the invention may provide convenience, cost saving, and timeliness in updating mobile device virus pattern data.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A method for updating virus pattern data in at least a mobile device for one or more anti-virus purposes, the method comprising:
   acquiring, using an image acquisition hardware component included in the mobile device, one or more images from at least a medium external to the mobile device;
   performing, using the mobile device, at least one of parsing and decoding of the one or more images to obtain a virus pattern, the virus pattern pertaining to at least part of a virus, the virus being configured to cause at least one of data loss of the mobile device and malfunction of the mobile device; and
   updating, using the mobile device, the virus pattern data using the virus pattern, the virus pattern data including a set of virus patterns for detecting a set of viruses, the set of viruses being configured to cause damage to the mobile device.

2. The method of claim 1 wherein the one or more images include at least one of a matrix code, a QR code, and a barcode.

3. The method of claim 1 wherein the one or more images show no alphanumerical symbol.

4. The method of claim 1 wherein the at least the medium includes at least one of a webpage, a television image, an outdoor medium, and an email message.

5. The method of claim 1 wherein the one or more images are displayed along with a message, the message being in a language used by a user of the mobile device.

6. The method of claim 1 wherein the image acquisition hardware component included in the mobile device is a camera of the mobile device.

7. The method of claim 1 wherein the image acquisition hardware component includes at least one of an image sensor, a camera, and a scanner.

8. The method of claim 1 further comprising:
   compressing the virus pattern to generate a compressed virus pattern, and
   encoding the compressed virus pattern to generate the one or more images.

9. The method of claim 1 further comprising:
   dividing the virus pattern to generate a plurality of partial virus patterns, and
   encoding the plurality of partial virus patterns to generate the one or more images.

10. The method of claim 1 further comprising performing, using the mobile device, one or more of decompression and assembly of intermediary data resulted from the at least one of parsing and decoding of the one or more images before obtaining the virus pattern.

11. An apparatus for updating a set of virus pattern data for one or more anti-virus purposes, the apparatus comprising:
   an image acquisition hardware component, included in a mobile device, configured to acquire one or more images from at least a medium external to the apparatus, wherein data pertaining to a virus pattern is encoded in the one or more images, the virus pattern pertaining to at least part of a virus, the virus being configured to cause at least one of data loss of the mobile device and malfunction of the mobile device:
   a processor configured to perform at least one of parsing and decoding of the one or more images for obtaining the virus pattern; and
   circuits, included in the mobile device, configured to cooperate with software to update the set of virus pattern data using the virus pattern, the virus pattern data including a set of virus patterns for detecting a set of viruses, the set of viruses being configured to cause damage to the apparatus.

12. The apparatus of claim 11 wherein the one or more images include at least one of a matrix code, a QR code, and a barcode.

13. The apparatus of claim 11 wherein the one or more images show no alphanumerical symbols.

14. The apparatus of claim 11 wherein the one or more images are included in at least one of a webpage, a printed medium, an outdoor medium, an email message, and a multimedia message and are displayed along with a message, the message being in a language used by a user of the apparatus.

15. The apparatus of claim 11 wherein the image acquisition hardware component includes at least one of an image sensor, a camera, and a scanner.

16. The apparatus of claim 11 further comprising a decompression program configured to decompress the data pertaining to the virus pattern for obtaining the virus pattern.

17. The apparatus of claim 11 further comprising an assembler program configured to combine the data pertaining to the virus pattern for obtaining the virus pattern, wherein the data pertaining to the virus pattern are encoded in a plurality of images, and the plurality of images are represented by the one or more images.

18. An apparatus for providing a virus pattern for use by a mobile device for one or more anti-virus purposes, the apparatus comprising:
   an encoder configured to encode data concerning the virus pattern to generate one or more images, the virus pattern pertaining to at least part of a virus, the virus being configured to cause at least one of data loss of the mobile device and malfunction of the mobile device;
   a parser operating cooperatively with at least a processor configured to perform at least one of parsing and decoding of the one or more images acquired from at least a medium external to the mobile device for obtaining the virus pattern; and
   circuits, included in the mobile device, configured to perform one or more tasks of the encoder for updating a set of virus pattern data using the virus pattern, the virus pattern data including a set of virus patterns for detecting a set of viruses, the set of viruses being configured to cause damage to the apparatus.

19. The apparatus of claim 18 further comprising a compression program configured to compress the virus pattern to generate the data concerning the virus pattern.

20. The apparatus of claim 18 further comprising a divider program configured to divide the virus pattern to generate the data concerning the virus pattern, the data concerning the virus pattern being encoded into a plurality of images, the plurality of images being represented by the one or more images.

\* \* \* \* \*